United States Patent [19]

Ranjan et al.

[11] Patent Number: 4,807,082

[45] Date of Patent: Feb. 21, 1989

[54] CURRENT SURGE PROTECTOR FOR POWER FUSES

[75] Inventors: Radhakrishnan Ranjan, Hickory; William E. Lazenby, Statesville, both of N.C.

[73] Assignee: General Electric Corporation, King of Prussia, Pa.

[21] Appl. No.: 50,250

[22] Filed: May 14, 1987

[51] Int. Cl.$^4$ ............................................. H02H 5/04
[52] U.S. Cl. .................................... 361/104; 361/111; 361/118
[58] Field of Search ................. 361/104, 111, 117, 118

[56] References Cited

U.S. PATENT DOCUMENTS

| | | | |
|---|---|---|---|
| 3,566,197 | 2/1971 | Nilsson | 361/111 |
| 3,628,092 | 12/1971 | Keto et al. | 361/104 |
| 3,735,312 | 5/1973 | Nagel | 361/104 |
| 3,760,227 | 9/1973 | Poindexter | 361/111 |
| 4,486,734 | 12/1984 | Leach | 337/162 |
| 4,573,032 | 2/1986 | Hickey | 337/162 |

Primary Examiner—A. D. Pellinen
Assistant Examiner—Jeffrey A. Gaffin
Attorney, Agent, or Firm—Henry J. Policinski; William H. Murray

[57] ABSTRACT

An apparatus for preventing operation of a full range chemically augmented electrical fuse due to induced current surges includes a low inductance device electrically connected in series between an air gap device and a first terminal of a trigger circuit for triggering exothermic material within the fuse. A second air gap device is electrically connected in series with a second low inductance device. This series connection of the second air gap device and the second low inductance device is electrically connected in parallel with a high inductance device, the parallel connected combination being connected in series with a second terminal of the trigger circuit. All of these elements are electrically connected in parallel with the main fuse element which is electrically connected in series with the protected electrical power distribution system.

18 Claims, 3 Drawing Sheets

CURRENT SURGE PROTECTOR FOR POWER FUSES

BACKGROUND OF THE INVENTION

This invention relates to current interrupters for use in electrical power distribution systems and particularly to full range electrical fuses.

Full range electrical fuses provide a relatively inexpensive means of current interruption in a large variety of applications. Such fuses may be triggered by currents which exceed the rated current of the fuse or they may be triggered externally in which case they can interrupt currents below their rated currents. For example, in chemically activated full range fuses, a trigger circuit is used to fire a chemical charge which cuts the fuse element and interrupts the current in the circuit protected by the fuse.

One problem associated with the full range fuses are their susceptibility to triggering upon the occurrence of lightning or switching generated current surges. Typically, the trigger circuit which fires the chemical charge is isolated from the main fuse element by an air gap in order to prevent any current from flowing in the trigger circuit unless the main fuse element opens due to fault current or overload. Under lightning, switching or other surge current producing conditions, due to the high rate of rise of current produced under such conditions, higher voltage will be induced across the fuse inductance. This voltage could cause the air gap to spark-over and effect operation of the fuse. Although full range fuses can interrupt currents below their rated current, operation of fuses during lightning storms or as a result of switching generated current surges should be minimized in order to reduce power shutdown to consumers.

SUMMARY OF THE INVENTION

It is therefore an object of the present invention to provide a full range power fuse having minimal susceptibility to lightning or switching generated surge currents.

It is still another object of the present invention to provide surge current protection for full range power fuses which is relatively inexpensive and easy to manufacture.

These and other objects of the present invention are obtained by providing a low inductance device electrically connected in series between an air gap device and a trigger circuit associated with a triggerable chemically activated power fuse. A second air gap device is electrically connected in series with a second low inductance device. This series connection of the second air gap device and second low inductance device is electrically connected in parallel with a high inductance device, the parallel connected combination being connected in series with the trigger circuit. All the above elements are electrically connected in parallel with the main fuse element which is electrically connected in series with the protected electrical power distribution system.

In operation, whenever the voltage exceeds the breakdown voltage of the first air gap device, the gap sparks over and causes the voltage to be distributed across the first low inductance device, the high inductance device and the inductance of the trigger circuit. Because of the high inductance of the high inductance device, it will absorb almost all of the voltage across it. When the voltage across the high inductance device exceeds the spark-over voltage of the second air gap device, the second air gap device conducts and causes the second low inductance device to be connected in series with the trigger circuit. As a result, the peak current in the trigger circuit is limited by the trigger circuit inductance and the two low inductance devices.

Once the voltage across the high inductance device is below the breakdown voltage of the second air gap device, the second air gap device opens and shunts the current through the high inductance device. The high value of the inductance of this device forces the current through the trigger circuit to a minimum which in turn causes the first air gap device to stop conducting. This process limits the duration of current in the trigger circuit and hence the $I^2t$, which is the measure of the ignition sensitivity of the chemically activated fuse.

Other objects, features, and advantages of the present invention will be more fully apparent from the following detailed description of the preferred embodiment, the appended claims and the accompanying drawing.

DESCRIPTION OF THE PREFERRED EMBODIMENT

Figure 1:
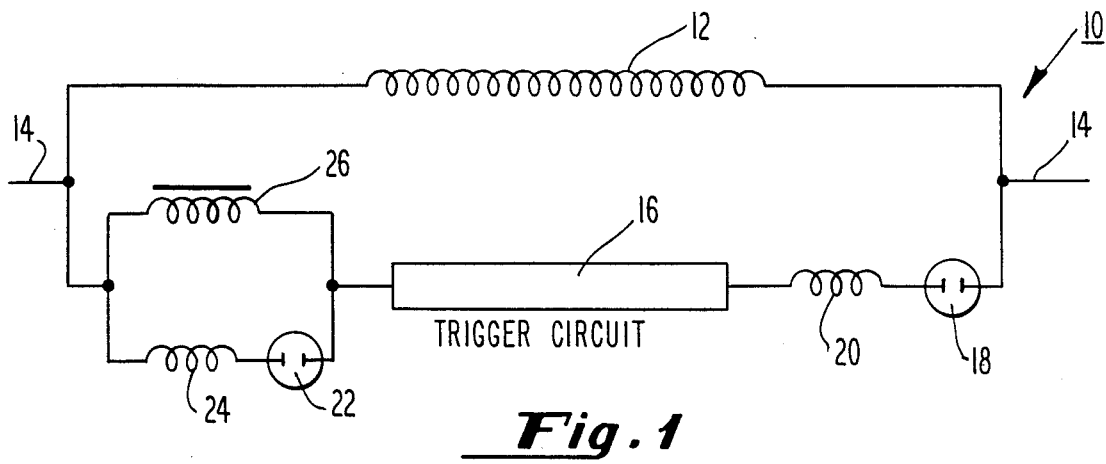
FIG. 1 is a schematic diagram of the preferred embodiment of the current surge protector for power fuses in accordance with the present invention.
Figure 2:
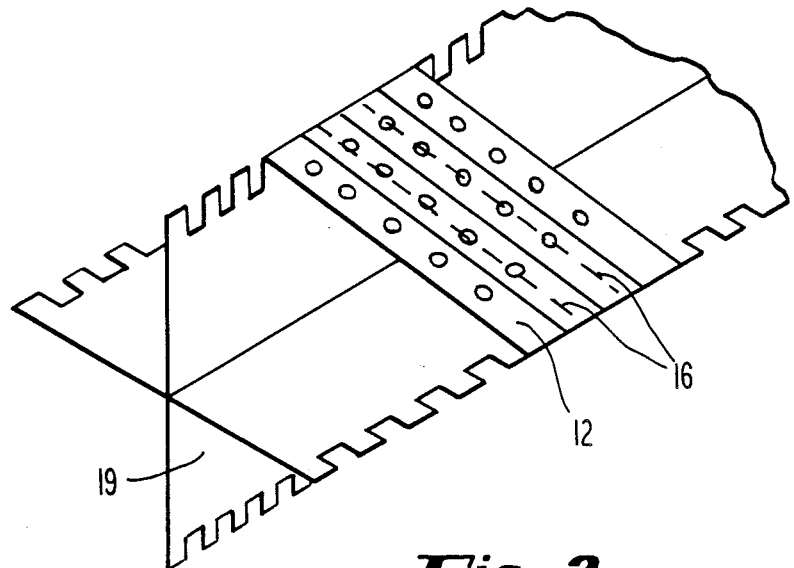
FIG. 2 is a perspective view of the preferred embodiment of the current surge protector which is shown schematically in FIG. 1.
Figure 3:
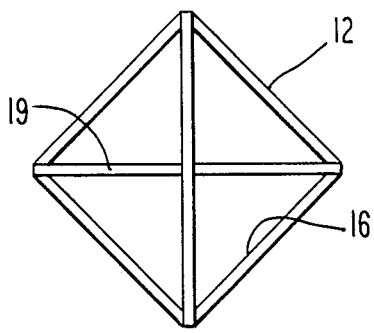
FIG. 3 is a end view of the preferred embodiment of the current surge protector depicted in FIG. 2.

FIG. 1 depicts the schematic arrangement of the preferred embodiment of the current surge protector of the present invention, generally designated 10, electrically connected in operating relationship with the main element 12 and trigger circuit 16 of a full range chemically augmented electrical fuse. The main element 12 is electrically connected in series with an electrical power distribution system 14. An electrical current through the electrical power distribution system 14 which exceeds the rating of the fuse, will cause the main element 12 of the fuse to open. The main element 12 may also be opened by explosive charge which is triggered by the trigger circuit 16. Such chemically augmented electrical fuses may be of the type shown and described in U.S. Pat. No. 4,486,734, issued to Leach and U.S. Pat. No. 4,573,032, issued to Hickey, both of which are assigned to the same assignee as the present invention, and both of which patents are incorporated by reference as if fully set forth herein. The trigger circuit 16, as shown in FIG. 2, is wound around a mica core 19 parallel to the main element 12 and approximately 0.1 inch below the element 12. This insures maximum coupling between the two circuits and improves the mutual inductance. Such an arrangement is shown and described in the aforementioned U.S. Pat. No. 4,573,032 issued to Hickey.

A first air gap device 18 is electrically connected in series with a first low inductance device 20. In the preferred embodiment, the first air gap device 18 has an impulse spark-over voltage approximately equal to 1,500 volts and a low frequency spark-over voltage of approximately 600 to 1,000 volts. The first low inductance device 20 is an air coil wound in such a way so that it does not link with other magnetic fields. The first low inductance device 20 has an inductance in the range of from approximately one microhenry to approximately three microhenrys. In the preferred embodiment, the inductance of the first low inductance device 20 is approximately equal to three microhenrys. The series connection of the first air gap device 18 and the first low inductance device 20 is electrically connected between the protected electrical power distribution system 14 and a first terminal of the trigger circuit 16.

A second air gap device 22 is electrically connected in series with a second low inductance device 24. In the preferred embodiment, the second air gap device 22 is the same as the first air gap device 18, having the same spark-over voltage ratings. The second low inductance element 24 is preferably the same as the first low inductance element 20, also having an inductance in the range of approximately one microhenry to approximately three microhenrys, with the preferred value being approximately three microhenrys. The series connection of the second air gap device 22 and the second low inductance device 24 is electrically connected in parallel with a high inductance device 26. In the preferred embodiment, the high inductance device 26 comprises a magnetic coil which is wound in the same direction as the fuse element 12 in order to arrest build up of the back voltage which opposes the applied voltage so that the current is reduced. The high inductance device 26 has an inductance in the range of from approximately one millihenry to approximately three millihenrys. In the preferred embodiment, the inductance of the high inductance device 26 is approximately equal to three millihenrys.

The combination of the second air gap device 22 in series with the second low inductance device 24 which is electrically connected in parallel with the high inductance device 26 is connected between a second terminal of the trigger circuit 16 and the protected power line 14.

The present invention, as depicted schematically in FIG. 1, operates as follows. The trigger circuit 16 is isolated from the electrical circuit during the normal operation of the fuse by the first air gap device 18. This is achieved by maintaining the voltage across the main element 12 well below the spark-over voltage of the first air gap device 18. However, the spark-over voltage of the first air gap device 18 is exceeded during the following conditions. First, when the main element 12 melts open because the current in the system exceeds the protected level by the fuse and the element 12 arcs. Second, during a lightning storm or a switching condition, when the rate of rise of current with time in the main element is of such a magnitude, the self inductance of the main element 12 generates a voltage higher than the spark-over voltage of the first air gap device 18.

Figure 4:
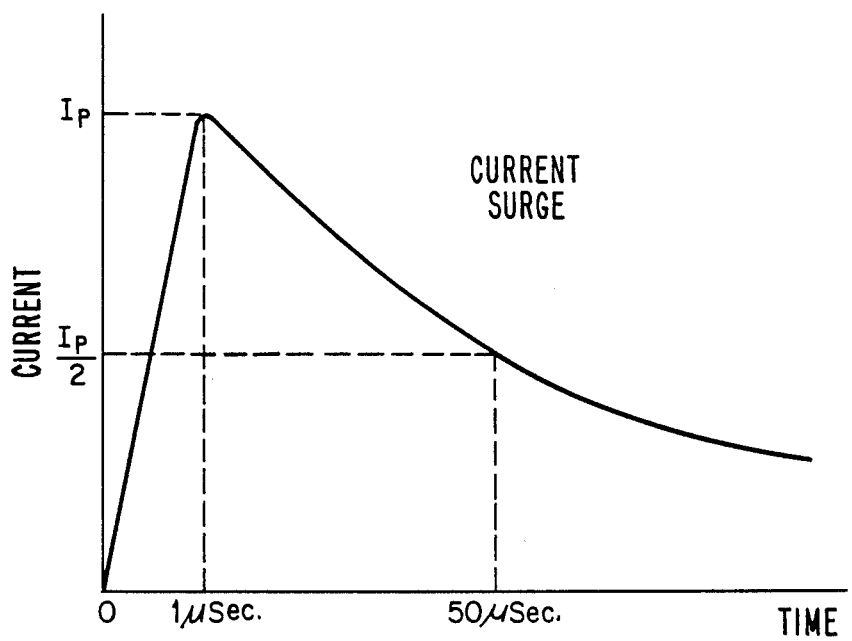
FIG. 4 depicts a typical wave form of the current surge through the main fuse element as a function of time.
Figure 5:
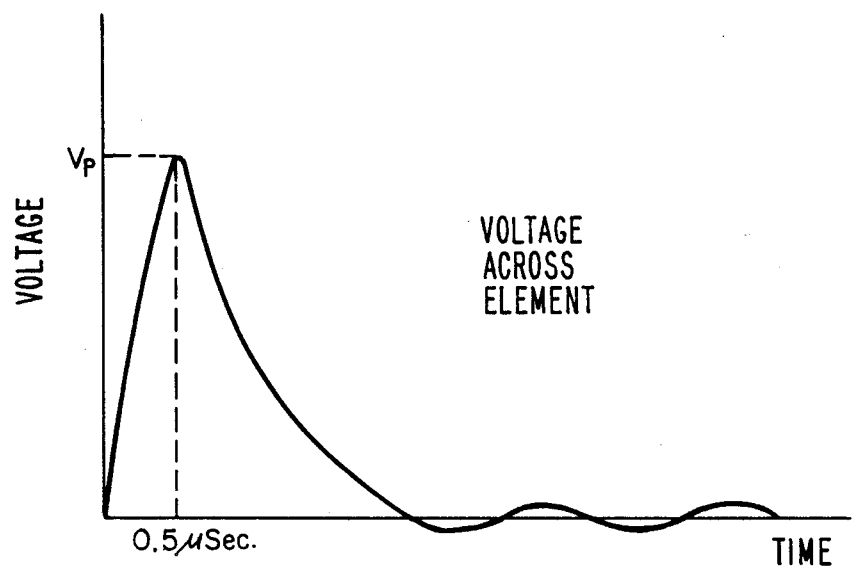
FIG. 5 depicts a typical wave form of the voltage across the main fuse element as a function of time.

The first condition is legitimate and the fuse will operate and protect the circuit. This is achieved by maintaining the low frequency (50 or 60 Hz) spark-over voltage between approximately 600 volts to 1,000 volts. The second condition is a nuisance, since the fuse will operate for no fault in the circuit, thereby resulting in unnecessary shutdown. The apparatus of the present invention is designed to minimize this operation of the fuse during current surges. The typical waveforms of the current surge and the associated voltage across the main element 12 are depicted in FIGS. 4 and 5 respectively. The first air gap device 18 operates whenever Vp exceeds the impulse spark-over voltage of the device. Under all other values, the first air gap device 18 isolates the trigger circuit 16.

During current surge conditions, when the first air gap device 18 operates, the entire voltage drops across the high inductance device 26 due to its high self inductance. This voltage is higher than the impulse spark-over voltage of the second air gap device 22 and therefore causes it to operate. Thus, the peak value of current in the trigger circuit is limited by the self inductances of the first low inductance element 20, the second low inductance element 24 and the trigger circuit 16, as well as the mutual inductance of the trigger circuit 16 and the main element 12. After approximately 0.5 $\mu$Sec, the voltage collapses as shown in FIG. 5 and the second air gap device 22 opens when the value of the voltage is below its impulse spark-over voltage. The current now shunts to the high inductance device 26 which forces it down to a low value to help the first air gap device 18 to open.

Thus, the apparatus of the present invention reduces the peak value and duration of current in the trigger circuit and hence the $I^2t$ which is the measure of exothermic block sensitivity. Accordingly, the use of the lightning surge protection circuit of the present invention, by limiting the current and hence the $I^2t$ in the trigger circuit, prevents ignition of the exothermic material as a result of current surges caused by lightning strokes, switching and the like. This increases the overall immunity of the full range fuse by preventing unnecessary operation during lightning storms, switching, or other current surge inducing phenomena.

It will be understood that various changes in the details, materials and arrangement of the parts which have been described and illustrated in order to explain the nature of this invention, may be made by those skilled in the art without departing from the principal and scope of the invention as expressed in the following claims.

We claim:

1. In a full range power fuse having a main fuse element electrically connectable in series with a protected electrical power system, and a current actuated trigger circuit for effecting a break in said main fuse element thereby interrupting current flow in said protected electrical power system, the trigger circuit having trigger inductance, means for preventing operation of said fuse due to induced current surges, and said means comprising:

(a) first means for turning on and conducting current to a first terminal of said trigger circuit through a first low inductance device to provide trigger current when the voltage across said first conducting means exceeds a first level of magnitude;

(b) second means for turning on and conducting said trigger current from a second terminal of said trigger circuit through a second low inductance device when the voltage across said second conducting means exceeds a second level of magnitude;

(c) a high inductance device electrically connected in parallel across said second conducting means and said second low inductance device; and (d) said high inductance device including means for applying said second voltage level to said second conductor means during said induced surges and turning on said second conductor to apply the combined inductances of said first and second low inductance devices and said trigger circuit to said trigger current during said surges and inductively limit said trigger current during said surges.

2. The apparatus in accordance with claim 1 wherein said first conducting means comprises an air gap device.

3. The apparatus in accordance with claim 2 wherein said second conducting means comprises an air gap device.

4. The apparatus in accordance with claim 3 wherein said first low inductance device comprises an air-core coil having an inductance in a range of from approximately one microhenry to approximately three microhenry.

5. The apparatus in accordance with claim 4 wherein said second low inductance device comprises an air-core coil having an inductance in the range from approximately one microhenry to approximately three microhenrys.

6. The apparatus in accordance with claim 5 wherein said high inductance device comprises a magnetic coil having an inductance in a range of from approximately one millihenry to approximately three millihenrys.

7. The apparatus in accordance with claim 1 wherein said high inductance device includes means for turning off said second conductor means during said limiting of said trigger current.

8. A chemically augmented fuse comprising:
   (a) a trigger conductor having trigger inductance;
   (b) exothermic material disposed adjacent to said trigger conductor, with said material being response to current flow in said trigger conductor so that a chemical reaction is initiated in said material in response to a predetermined level of current in said trigger conductor;
   (c) a fuse conductor disposed adjacent to said exothermic material; and
   (d) means for preventing operation of the fuse, due to induced current surges, said means comprising:
      (i) first means for turning on and conducting current to a first terminal of said trigger conductor through a first low inductance device to provide trigger current conducting means exceeds a first level of magnitude;
      (ii) second means for turning on and conducting said trigger current from a second terminal of said trigger conductor through a second low inductance device when the voltage across said second current conducting means exceeds a second level of magnitude;
      (iii) a high inductance device electrically connected in parallel across said second conducting means and said second low inductance device; and
      (iv) said high inductance device including means for applying said second voltage level across said second conductor means during said induced surges and turning on said second conductor to apply the combined inductances of said first and second low inductance devices and said trigger conductor to said trigger current during said surges and inductively limit said trigger current during said surges.

9. The chemically augmented fuse in accordance with claim 8 wherein said trigger conductor comprises at least one loop of electrically conductive material disposed so as to be inductively coupled to the magnetic field generated by current flow through said fuse conductor, so that the effective inductance of said trigger conductor is increased by said inductive coupling.

10. The chemically augmented fuse in accordance with claim 9 wherein said first and second electrical current conducting means each comprises an air gap device.

11. The chemically augmented fuse in accordance with claim 10 wherein each of said first and second low inductance devices comprises an air-core coil having an inductance in a range from approximately one microhenry to approximately three microhenrys.

12. The chemically augmented fuse in accordance with claim 11 wherein said high inductance device comprises a magnetic coil having an inductance in a range of from approximately one millihenry to approximately three millihenrys.

13. The chemically augmented fuse in accordance with claim 8 wherein said high inductance device includes means for turning off said second conductor means during said limiting of said trigger current.

14. A high voltage electric fuse comprising:
   (a) a first conductive terminal and a second conductive terminal spaced-apart from said first conductive terminal;
   (b) a fusable conductive element connected between said first and second conductive terminals;
   (c) bodies of exothermic material disposed closely adjacent to said conductive element at spaced-apart locations along the length of the conductive element, the exothermic material of each body having the property of exothermically reacting when heated to a predetermined temperature;
   (d) a triggering circuit having a first terminal and second terminal and having trigger inductance and a resistance that limits current between said first and second terminals to very low values until said fusable conductive element is disrupted;
   (e) means for connecting the bodies of exothermic material in good heat-transfer relationship with said triggering circuit and said fusable conductive element so that the heating effect of current through said triggering circuit upon disruption of said fusable conductive element causes the material of said body to exothermically react and thus cause further disruption of said fusable element at additional locations respectively located adjacent to said body;
   (f) means for electrically insulating said triggering circuit from said fusable conductive element at all points along the length of said fusable element; and
   (g) means for preventing operation of the fuse due to induced current surges, said means comprising:
      (i) first means for turning on and conducting electrical current from said first conductive current to said first terminal of said triggering circuit through a first low inductance device to provide trigger current when the voltage across said first electrical current conducting means exceeds a first level of magnitude;
      (ii) second means for turing on and conducting said trigger current from the second terminal of said triggering circuit to said second conductive terminal through a second low inductance device when the voltage across said second electrical current conducting means exceeds a second level of magnitude; and (iii) a high inductance device electrically connected in parallel across said second conducting means and said second low inductance device; and (iv) said high inductance device including means for applying said second voltage level across said second conductor means during said induced surges and turning on said second conductor to apply the combined inductances of said first and second low inductance devices and said triggering circuit to said trigger current during said surges and inductively limit said trigger current during said surges.

15. The high voltage electric fuse in accordance with claim 14 wherein n said first and second electrical current conducting means each comprises an air gap device.

16. The high voltage electric fuse in accordance with claim 15 wherein said first and second low inductance devices each comprises an air-core coil having an inductance in a range of from approximately one microhenry to approximately three microhenrys.

17. The high voltage electric fuse in accordance with claim 16 wherein said high inductance device comprises a magnetic coil having an inductance in a range of approximately one millihenry to approximately three millihenrys.

18. The high voltage electric fuse in accordance with claim 14 wherein said high inductance device includes means for turning off said second conductor means during said limiting of said trigger current.

* * * * *

UNITED STATES PATENT AND TRADEMARK OFFICE
CERTIFICATE OF CORRECTION

PATENT NO. : 4,807,082
DATED : February 21, 1989
INVENTOR(S) : Ranjan et al

It is certified that error appears in the above-identified patent and that said Letters Patent is hereby corrected as shown below:

Column 5, line 44, add the words "when the voltage across said first current" between the words "current" and "conducting".

Column 7, line 17, delete the letter "n".

Signed and Sealed this

Twenty-ninth Day of August, 1989

Attest:

DONALD J. QUIGG

*Attesting Officer*

*Commissioner of Patents and Trademarks*